Feb. 12, 1946.   L. C. STURBELLE   2,394,570
PRODUCTION OF POTASSIUM CHLORIDE AND MAGNESIA
Filed June 17, 1943
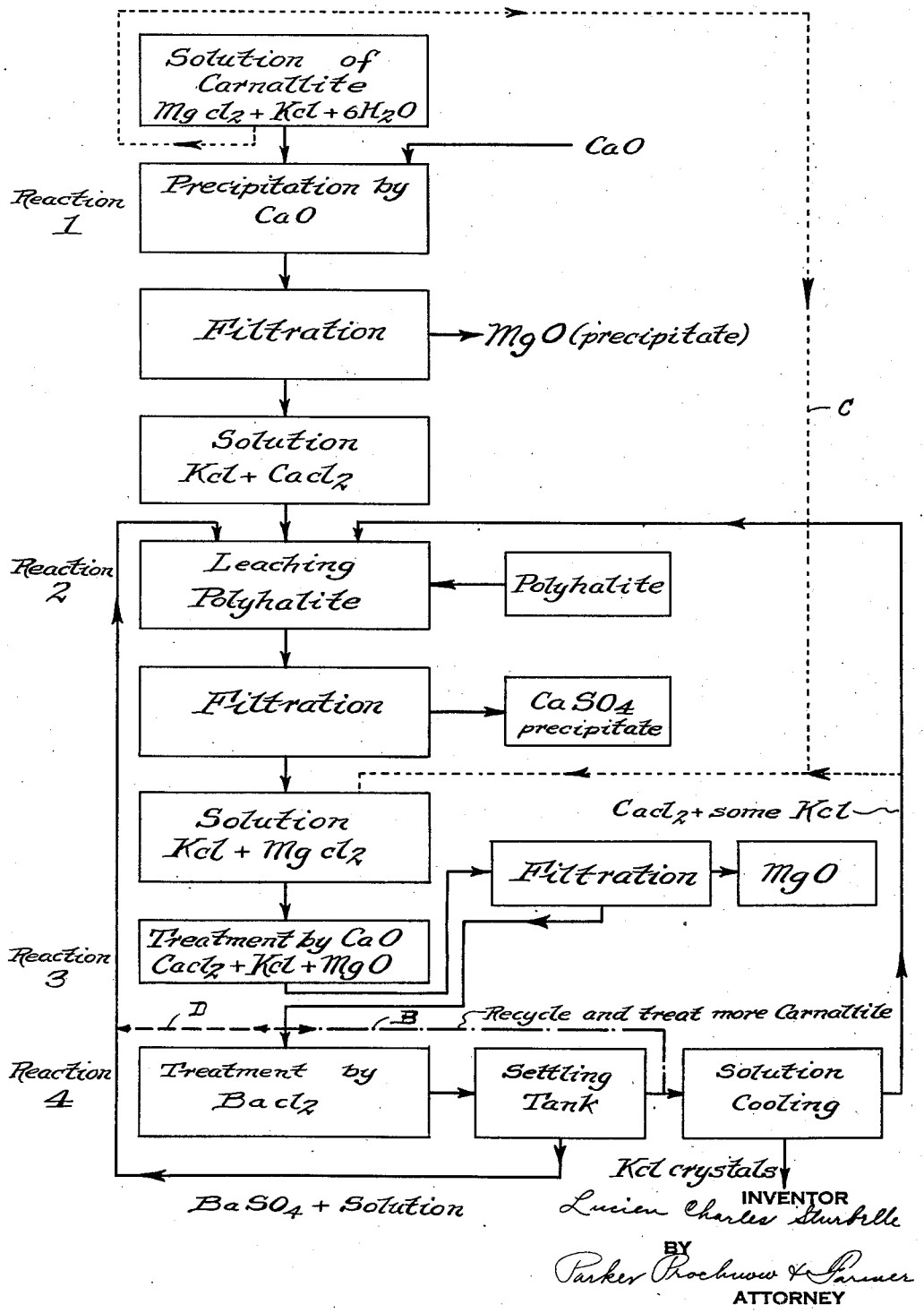

UNITED STATES PATENT OFFICE 2,394,570

PRODUCTION OF POTASSIUM CHLORIDE AND MAGNESIA

Lucien Charles Sturbelle, New York, N. Y.

Application June 17, 1943, Serial No. 491,168

12 Claims. (Cl. 23—33)

This invention relates to the production of potassium chloride and magnesium oxide or magnesia from carnallite and polyhalite.

It is known that by treating a solution of carnallite with lime, one may obtain a solution containing potassium chloride and calcium chloride with a precipitate of magnesia. By filtering off the magnesia and by evaporation of the solution, one may obtain crystals of potassium chloride which are thereby separated from the brine. The extraction of the magnesia is practically 100% but loss of potassium chloride occurs and is important, because the brine is always richer in calcium chloride until the moment when this salt crystallizes also. The brine must be discarded and the potassium chloride which is contained therein is lost.

It is also known that polyhalite dissolves in cold water giving a solution of magnesium sulphate, and the residue when treated with hot water gives potassium sulphate in solution. In either case, the leaching or formation of solutions is difficult, and the sulphate of potassium must be transformed into the potassium chloride, and the magnesium sulphate is very difficult to transform into pure magnesia.

An object of this invention is to provide an improved method of obtaining potassium chloride and magnesia from carnallite and polyhalite, with which no potassium or magnesium is lost; with which recovery of magnesia and potassium in pure form will be substantially 100%; which will require only relatively simple apparatus; with which the action may be carried on in a substantially continuous manner; and with which the cost of operation will be a minimum.

Other objects and advantages will be apparent from the following description of an example of the invention, and the novel features will be particularly pointed out hereinafter in connection with the appended claims.

In the accompanying drawing, I have illustrated a flow diagram of the various steps of the improved process.

In accordance with my discovery, a solution of carnallite, which may advantageously be a water solution, is reacted upon with lime and the following reaction occurs:

(1)   $MgCl_2+KCl+CaO=CaCl_2+KCl+MgO$

The magnesium oxide, present as a precipitate, is separated by filtration and constitutes one of the products of the process. The resulting solution containing calcium chloride and potassium chloride is then used to dissolve polyhalite with the following reaction:

(2) 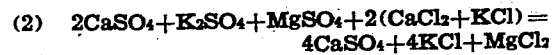 $2CaSO_4+K_2SO_4+MgSO_4+2(CaCl_2+KCl)=$
$4CaSO_4+4KCl+MgCl_2$

It will be noted that by this Reaction 2 a precipitate of calcium sulphate is formed in a solution of potassium chloride and magnesium chloride and by filtration the calcium sulphate is separated and discarded. The solution containing potassium chloride and magnesium chloride is then reacted upon with further lime which precipitates magnesium oxide or magnesia in a solution containing calcium chloride and potassium chloride in a Reaction 3 similar to Reaction 1, but for the quantities employed one now has $4KCl+CaCl_2$ in solution. In this reaction, the magnesium oxide is precipitated off and used as one of the products of the method. It will be noted that the reaction with polyhalite started with $2(CaCl_2+KCl)$, but at the finish the quantities are $CaCl_2+4KCl$, showing a decided increase in the proportion of potassium chloride in this solution.

When starting this process in operation, this filtered solution obtained from Reaction 3 is recycled back into the Reaction 2 for the treatment of polyhalite, as shown by dash line D on the flow sheet, and when such solution is added to the solution from the original treatment of the solution of carnallite with lime, one obtains a solution having $2CaCl_2+5KCl$ instead of $2CaCl_2+2KCl$. This indicates that the potassium chloride has increased from two parts of KCl for each two parts of calcium chloride to 5 parts of potassium chloride for each two parts of calcium chloride.

It is to be particularly noted that the calcium chloride content in the solution from Reaction 3 remains constant, but the potassium chloride content in that solution increases and can easily be crystallized out after the concentration is sufficient. This crystallization can be caused by cooling of a portion of the solution, as shown by the dot and dash line B in the flow sheet. This crystallizes out a substantial part of the potassium chloride, and the balance of the solution from which the crystals have been removed and which contains both calcium chloride and potassium chloride is recycled back and added either to the solution used to leach further polyhalite or to the solution of carnallite entering into Reaction 3. After the method has been in operation until a substantial concentration of potassium chloride has been obtained, the method may be condensed or simplified by eliminating Reaction 1 and the first filtration, in which case, the solution of carnallite is added directly to the solution of potassium chloride and magnesium chloride obtained from the solution separated from the precipitate of calcium sulphate, as shown by the dotted line C in the flow sheet. In that case, the carnallite is treated with lime and filtered as a part of Reaction 3, which eliminates the necessity of a separate filtration operation for Reaction 1.

It will be observed from these reactions that the solution of calcium chloride and potassium chloride is used over and over to increase the potassium chloride content relatively to the calcium chloride content. The potassium chloride crystals obtained in this manner are white and contain over 95% of potassium chloride. The magnesium oxide and potassium chloride are both recovered completely, and the only product which has little value is the calcium sulphate.

In order to obtain purer potassium chloride before the crystallization, I preferably treat the concentrated solution, in the cycle following Reaction 3, with barium chloride (BaCl₂) and the barium chloride precipitates out Reaction 4 as barium sulphate (BaSO₄) any small quantities of calcium sulphate that remain in the solution. This mixture is then allowed to settle, and the settled precipitate of barium sulphate with some of the suspending solution is then recycled back and added to the solution coming from Reaction 1 for the treatment of further polyhalite. The barium sulphate precipitate which is carried in suspension and used to treat further polyhalite is removed in the following filtration operation, where the barium sulphate is filtered out in the same operation with the calcium sulphate. The remaining solution from the settling tank is then cooled, which precipitates out a substantial quantity of pure potassium chloride that is separated off in any suitable manner. The resultant brine containing calcium chloride and some potassium chloride is then recycled back and added to the solution with which the further polyhalite is treated.

The polyhalite is transformed into the chloride in a few seconds of time with evolution of heat, and the volume of the solution remains quite constant. Each filtration is a very simple one, and while any suitable filter may be employed, that disclosed in my copending application Serial No. 331,265, filed April 23, 1940, is very suitable and practical for this purpose.

In the flow sheet, the steps are indicated in sequence, but the dash line D after the filtration following Reaction 3 indicates the arrangement that may be employed at the start of the operation for recycling the solution of calcium chloride and potassium chloride until the content of potassium chloride in the solution has been built up to an extent at which some of it may be crystallized out to advantage. The dot and dash line B indicates the movement of some of the solution from the filtration following Reaction 3, after a desired content of potassium chloride has been obtained, through the cooling step to crystallize out some of the potassium chloride. The full lines below the dash line and dot and dash line indicate the flow when the solution is treated with the barium chloride to remove any of the calcium sulphate that remains in solution.

It will be noted that only simple apparatus is employed, and that the raw materials are only the carnallite, polyhalite, lime and barium chloride, and that one obtains by this invention, magnesia, potassium chloride and calcium sulphate.

It will be understood that various changes in the details, materials and arrangements of the steps, which have been hereindescribed and illustrated in order to explain the nature of the invention, may be made by those skilled in the art within the principle and scope of the invention as expressed in the appended claims.

I claim as my invention:

1. The method of obtaining potassium chloride and magnesium oxide from carnallite which comprises reacting upon a solution of said carnallite with lime to precipitate magnesium oxide in a solution of potassium chloride and calcium chloride, separating off said precipitated oxide, leaching polyhalite with the separated liquid to form a precipitate of calcium sulphate in a solution of potassium chloride and magnesium chloride, separating off the calcium sulphate, reacting upon the liquid separated from the calcium sulphate with lime to precipitate magnesium oxide in a liquid in which the ratio of potassium chloride to calcium chloride is greater than that present in the liquid used to leach polyhalite, recycling the richer liquid to leach further polyhalite until the concentration of potassium chloride therein is increased, separating the richer liquid from solid precipitates therein, crystallizing out the potassium chloride from said richer recycled liquid by cooling, and recycling the cooled liquid from which the crystals are separated to leach further polyhalite.

2. The method of obtaining potassium chloride and magnesium oxide from carnallite which comprises reacting upon a solution of said carnallite with lime to precipitate magnesium oxide in a solution of potassium chloride and calcium chloride, separating off said precipitated oxide, leaching polyhalite with the separated liquid to form a precipitate of calcium sulphate in a solution of potassium chloride and magnesium chloride, separating off the calcium sulphate, reacting upon the liquid separated from the calcium sulphate with lime to precipitate magnesium oxide in a liquid in which the ratio of potassium chloride to calcium chloride is greater than that present in the liquid used to leach polyhalite, reacting upon the richer liquid with barium chloride to precipitate any calcium sulphate remaining in the solution, recycling the precipitated barium sulphate and some of the suspending liquid to leach further polyhalite separating the rest of the suspending liquid from solid precipitates therein, cooling the rest of such suspending liquid to crystallize out pure potassium chloride, separating off the crystals, and recycling the cooled separated liquid to leach further polyhalite.

3. The method of obtaining potassium chloride and magnesia from carnallite which comprises reacting upon a solution of carnallite with lime to precipitate magnesia, reacting upon polyhalite with the resulting liquid of said first reaction, reacting upon the resulting liquid from the second reaction with lime to precipitate further magnesia, separating the magnesia, reacting upon further polyhalite entering into said second reaction with the resulting liquid from the third reaction thereby to increase the concentration of potassium chloride, with respect to the calcium chloride, in the liquid resulting from said second reaction, removing part of the potassium chloride by crystallization from the enriched liquid of said third reaction, and reacting upon further polyhalite entering into said second reaction with the liquid from which the crystals are removed.

4. The method of obtaining potassium chloride and magnesia from carnallite which comprises reacting upon a solution of carnallite with lime to precipitate magnesia, reacting upon polyhalite with the resulting liquid of said first reaction, reacting upon the resulting liquid from the second reaction with lime to precipitate further magnesia, separating the magnesia, reacting upon further polyhalite entering into said second reaction with the resulting liquid from the third reaction to increase the concentration of potassium chloride, with respect to the calcium chloride, in the liquid resulting from said second reaction, treating the enriched liquid from said third reaction with barium chloride to precipitate out as barium sulphate any calcium sulphate remaining in solution in said enriched liquid, separating the precipitate, crystallizing out potassium chloride from the liquid treated by barium chloride, and adding the liquid from which said crystals have been removed to that entering into said second reaction.

5. The method of obtaining potassium chloride and magnesia from carnallite which comprises reacting upon a solution of carnallite with lime to precipitate magnesia, reacting upon polyhalite with the resulting liquid of said first reaction, reacting upon the resulting liquid from the second reaction with lime, to precipitate further magnesia, separating the magnesia, reacting upon further polyhalite entering into said second reaction with the resulting liquid from the third reaction to increase the concentration of potassium chloride, with respect to the calcium chloride, in the liquid resulting from said second reaction, treating the enriched liquid from said third reaction with barium chloride to precipitate out as barium sulphate any calcium sulphate remaining in the solution in said enriched liquid, adding the precipitated barium sulphate and part of the suspending liquid to the liquid entering into said second reaction, separating the rest of the suspending liquid from solid precipitates therein, crystallizing out potassium chloride from the other part of said suspending liquid, and adding the liquid from which said crystals have been removed to that entering into said second reaction.

6. The method of obtaining potassium chloride and magnesia from carnallite which comprises reacting upon a solution of carnallite with lime to precipitate magnesia and obtain a solution of potassium chloride and calcium chloride, reacting upon polyhalite with said second solution to obtain a precipitate of calcium sulphate in a suspending liquid of potassium chloride and magnesium chloride, separating the precipitated calcium sulphate, reacting upon said last named liquid with further lime to precipitate further magnesia in a liquid richer in potassium chloride with respect to the calcium chloride than said second solution, recycling said enriched liquid through the reaction with polyhalite to further increase the potassium chloride content of said liquid resulting from said second lime reaction, separating precipitates from said liquid before crystallization therefrom, crystallizing out some of the potassium chloride from said higher content liquid, and recycling the liquid from which the crystals are removed through said reaction with polyhalite.

7. The method substantially as set forth in claim 6, and treating the portion of the liquid from which potassium chloride is crystallized, before said crystallization, with barium chloride to precipitate as barium sulphate, any calcium sulphate remaining in solution in said higher content liquid, and recycling through the reaction with polyhalite the precipitated barium sulphate and some of the suspending liquid.

8. The method of obtaining potassium chloride and magnesia from carnallite which comprises reacting upon a solution of carnallite with lime to precipitate magnesia and obtain a solution of potassium chloride and calcium chloride, reacting upon polyhalite with said second solution to obtain a precipitate of calcium sulphate in a suspending liquid of potassium chloride and magnesium chloride, separating the precipitated calcium sulphate, reacting upon said liquid with further lime to precipitate further magnesia in a liquid richer in potassium chloride, with respect to the calcium chloride, than said second solution, separating the magnesia, crystallizing out some of the potassium chloride from said richer liquid, and recycling through the reaction with said polyhalite the rest of said richer liquid including that from which potassium chloride has been crystallized out.

9. The method of obtaining potassium chloride and magnesia from carnallite which comprises reacting upon a solution of carnallite with lime to precipitate magnesia, reacting upon polyhalite with the liquid resulting from said reaction, reacting upon the liquid resulting from said second reaction with lime to precipitate further magnesia, separating the magnesia, recycling the liquid resulting from said third reaction back into that entering into said second reaction, to increase the content of potassium chloride therein, with respect to the calcium chloride, and crystallizing out potassium chloride from the recycled liquid from said third reaction.

10. The method of obtaining potassium chloride and magnesium oxide which comprises leaching polyhalite with a solution containing potassium chloride and calcium chloride, to form calcium sulphate, potassium chloride and magnesium chloride, mixing the solution of potassium and magnesium chlorides so obtained with a solution of carnallite, reacting upon this mixture with lime to obtain magnesium oxide and a solution of potassium chloride and calcium chloride, thereby to yield a liquid in which the ratio of potassium chloride to calcium chloride is greater than that present in the liquid used to leach polyhalite, filtering off the magnesium oxide, treating the resultant liquid with barium chloride to clean this liquid of any small quantities of calcium sulphate, separating the barium sulphate, and then precipitating out potassium chloride by cooling this treated liquid.

11. The method of obtaining potassium chloride and magnesium oxide which comprises leaching polyhalite with a solution containing potassium chloride and calcium chloride, to form calcium sulphate, potassium chloride and magnesium chloride, mixing the solution of potassium and magnesium chlorides so obtained with a solution of carnallite, reacting upon this mixture with lime to obtain magnesium oxide and a solution of potassium chloride and calcium chloride, thereby to yield a liquid in which the ratio of potassium chloride to calcium chloride is greater than that present in the liquid used to leach polyhalite, filtering off the magnesium oxide, and then precipitating out potassium chloride by cooling this treated liquid.

12. The method of obtaining potassium chloride and magnesium oxide which comprises leaching polyhalite with a solution containing potassium chloride and calcium chloride, to form calcium sulphate, potassium chloride and magnesium chloride, mixing the solution of potassium and magnesium chlorides so obtained with a solution of carnallite, reacting upon this mixture with lime to obtain magnesium oxide and a solution of potassium chloride and calcium chloride, thereby to yield a liquid in which the ratio of potassium chloride to calcium chloride is greater than that present in the liquid used to leach polyhalite, filtering off the magnesium oxide, using the resultant liquid to leach further polyhalite in this method, and thereby increase the concentration of potassium chloride in said resultant liquid, and removing some potassium chloride from this concentrated resultant liquid before it is added to further carnallite solution.

LUCIEN CHARLES STURBELLE.